United States Patent Office 3,636,069
Patented Jan. 18, 1972

3,636,069
CERTAIN NOPINOL DERIVATIVES
Thomas W. Gibson, Cincinnati, Ohio, assignor to The
Procter & Gamble Company, Cincinnati, Ohio
No Drawing. Original application Dec. 16, 1966, Ser. No.
602,141, now Patent No. 3,522,276, dated July 28,
1970. Divided and this application Dec. 11, 1969, Ser.
No. 889,777
Int. Cl. C07c 77/02, 81/02, 131/02
U.S. Cl. 260—466       1 Claim

ABSTRACT OF THE DISCLOSURE

The synthesis of the novel intermediates, cis-2-nopinyl nitrite, 8-nitroso-cis-nopinol dimer and 8-oximino-cis-nopinol, and the final product, 1-methyl-2-hydroxy-3-oxatricyclo[5.2.0.0$^{4,9}$] nonane, useful as a perfume, is disclosed.

This application is a divisional application of copending U.S. patent application of Thomas W. Gibson, Ser. No. 602,141, filed Dec. 16, 1966, now U.S. Pat. No. 3,522,276.

This invention relates to the synthesis of 1-methyl-2-hydroxy-3-oxatricyclo[5.2.0.0.$^{4,9}$]nonane and to novel intermediate compounds and reactions of said synthesis. More specifically, a four-step process starting with readily preparable cis-nopinol, through the sequential formation of the novel compounds cis-2-nopinyl nitrite, 8-nitroso-cis-nopinol dimer, and 8-oximino-cis-nopinol, and resulting ultimately in the formation of 1-methyl-2-hydroxy-3-oxatricyclo[5.2.0.0$^{4,9}$]nonane has been discovered.

1-methyl-2-hydroxy - 3 - oxatricyclo[5.2.0.0$^{4,9}$]nonane has an odor characterized as strong green-pithy camphoraceous and is useful in the perfume arts as described in detail hereinafter. This compound can be readily oxidized to 1-methyl-2-oxo - 3 - oxatricyclo[5.2.0.0$^{4,9}$]nonane, a compound that is also useful in the perfume arts as described in the co-pending U.S. patent application of Thomas W. Gibson and William F. Erman, Ser. No. 602,132, filed concurrently herewith now U.S. Pat. 3,481,998. An alternative method of preparing 1-methyl-2-oxo-3-oxatricyclo[5.2.0.0$^{4,9}$]nonane is also disclosed in said co-pending application.

Accordingly, objects of this invention are: To provide a novel synthesis of 1-methyl-2-hydroxy-3-oxatricyclo-[5.2.0.0.$^{4,9}$]nonane; to provide a novel synthesis of 1-methyl-2-oxo-3-oxatricyclo[5.2.0.0$^{4,9}$]nonane; to provide novel reactions intermediate to said syntheses; and to provide novel compounds intermediate to said syntheses.

Further objects of this invention relating to the perfume and detergent arts will be apparent herein.

The above and other objects are achieved by a novel process for the synthesis of 1-methyl-2-hydroxy-3-oxatricycle[5.2.0.0$^{4,9}$]nonane, which comprises:

(a) Nitrosolyating cis-nopinol (1) to form cis-2-nopinyl nitrite (2);

(b) Irradiating the nitrite of step (a) with ultraviolet light to form 8-nitroso-cis-nopinol dimer (3);

(c) Pyrolyzing the dimer (3) of step (b) to form 8-oximino-cis-nopinol (4); and (d) Hydrolyzing the oxime (4) of step (c) to form 1-methyl-2-hydroxy-3-oxatricyclo[5.2.0.0$^{4,9}$]nonane (5).

An optional step (e) in this process comprises oxidizing the nonane (5) to form 1-methyl-2-oxo-3-oxatricyclo[5.2.0.0$^{4,9}$]nonane.

The above-described process is illustrated schematically in FIG. 1 and is disclosed in more detail in Example I, infra. Respective steps (a) through (d) involve individual reactions whose conditions are known in the art. References wherein these conditions are disclosed are summarized in Table 1. This table also shows preferred temperature conditions for each step.

TABLE 1

| Step | Preferred temperature conditions | | Reference |
|---|---|---|---|
| | Broad range, °C. | Narrow range,[1] °C. | |
| (a) | −30−+10 | 0−5 | D. H. R. Barton et al., J. Am. Chem. Soc., 82, 2640 (1960). |
| (b) | 0−50 | 10−25 | Do. |
| (c) | 70−100 | 75−85 | Do. |
| (d) | 10−35 | 15−30 | Do. |
| (e) | 50−100 | 65−75 | A. Bowers et al., J. Chem. Soc., 2548 (1953). |

[1] Highly preferred.

FIGURE 1

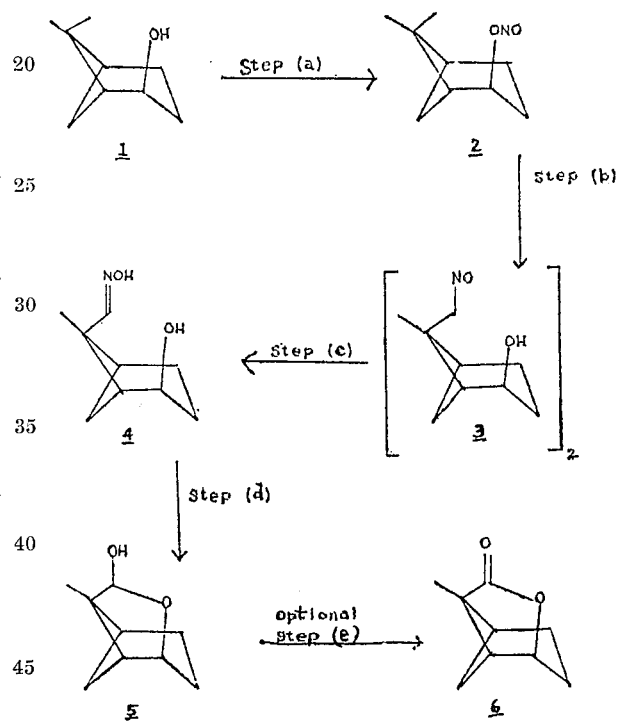

As mentioned hereinbefore, compound 5 has an odor defined as strong green-pithy camphoraceous and thus can be used as an odorant per se or as a component of perfume compositions for ultimate use in products such as soaps, detergents, deodorants and the like. Perfume compositions, preferably of the herbal bouquet type, containing odoriferously effective amounts, e.g., 0.0001% to 80%, preferably 0.1% to 20%, of 5 are desirable and useful.

EXAMPLE I

Synthesis of 1-methyl-2-hydroxy-3-oxatricyclo[5.2.0.0$^{4,9}$] nonane

*Step (a)*.—To a solution of 15.4 g. cis-nopinol (1) in 200 ml. dry pyridine was added 11.0 g. NOCl by flask to flask distillation, at 0°. After an additional one hour at 0°, the mixture was allowed to warm to room temperature,[1] poured into 1.5 liters water, and extracted with ether. The ether solution was washed with water, cold dilute HCl, and again with water. After drying over MgSO$_4$, filtration and removal of solvent gave 18.6 g. of cis-2-nopinyl nitrite (2).

[1] In the examples herein, "room temperature" refers to 20–26° C.

*Step (b).*—The nitrite 2 (18.6 g.) was dissolved in 430 ml. cyclohexane, placed in a photochemical reaction flask equipped with a Vycor immersion well, and irradiated at room temperature with a 450 watt mercury lamp (Hanovia #679A, a conventional laboratory source of ultraviolet radiation) for 6 hours to yield, after removal of solvent, 14.2 g. of 8-nitroso-cis-nopinol dimer (3).

*Step (c).*—The dimer 3 (14.2 g.) was dissolved in 400 ml. isopropyl alcohol and refluxed for 36 hours at 82° C. Under these conditions, 3 pyrolyzes to 4. Removal of solvent gave 10.5 g. of 8-oximino-cis-nopinol (4) which solidified on standing. Recrystallization from pentane-ether gave 4 with M.P. 121–2°, $\lambda_{max}$ 3.05$\mu$ ($CH_2Cl_2$), and n.m.r. signals at $\tau$8.64 (3H, singlet), 5.90 (1H, multiplet), and 2.63 (1H, singlet).

*Analysis.*—Calcd. for $C_9H_{15}NO_2$ (percent): C, 63.88; H, 8.94; N, 8.28. Found (percent): C, 63.95; H, 8.96; N, 8.16.

*Step (d).*—8-oximino-cis-nopinol (4) (9.5 g.) was dissolved in 570 ml. 80% acetone-water containing 2% concentrated HCl and stirred overnight at room temperature. The solution was poured into water, extracted with ether, and the ether solution washed with saturated $NaHCO_3$ and saturated NaCl, dried over $MgSO_4$, filtered and stripped to 5.0 g. of 1-methyl-2-hydroxy-3-oxatricyclo[5.2.0.0$^{4,9}$]nonane (5). Continuous extraction of the aqueous phase gave an additional 2.69 (87% total yield) of product, 5. Pure 5, obtained by gas chromatography, showed $\lambda_{max}$ 2.90$\mu$ (no C=O bond) and n.m.r. signals at $\tau$8.75 (3H, singlet), 8.85 (1H, doublet, J=10.8 c.p.s.), 5.28 (1H, multiplet), and 4.87 (1H, singlet). Formation of a 2,4-dinonyl phthalate derivative, M.P. 177–8° was carried out in $H_3PO_4$ ethanol solution.

*Analysis.*—Calcd. for $C_{15}H_{18}N_4O_5$ (percent): C, 53.88; H, 5.43; N, 16.76. Found (percent): C, 53.99; H, 5.51; N, 17.29.

EXAMPLE II

Synthesis of 1-methyl-2-oxo-3-oxatricyclo[5.2.0.0$^{4,9}$]nonane

Oxidation of 0.409 g. of 1-methyl-2-hydroxy-3-oxatricyclo[5.2.0.0$^{4,9}$]nonane (5) with 0.2 g. $CrO_3$ in 25 ml. acetone at 70° C. gave 0.350 g. of 1-methyl-2-oxo-3-oxatricyclo[5.2.0.0$^{4,9}$]nonane (6) B.P. 83–4°, identified by gas-chromatographic retention time and infrared spectrum by comparison with that of authentic material prepared as described in Example VI of the aforesaid copending U.S. patent application of Thomas W. Gibson and William F. Erman.

EXAMPLE III

Perfume compositions containing 1-methyl-2-hydroxy-3-oxatricyclo[5.2.0.0$^{4,9}$]nonane A perfume composition was prepared by intermixing the following components.

| Component: | Percent by wt. |
|---|---|
| 1-methyl-2-hydroxy-3-oxatricyclo[5.2.0.0$^{4,9}$]nonane | 5.00 |
| Benzyl acetate | 22.00 |
| Cassia | 0.50 |
| Cinnamic alcohol | 4.50 |
| Clove buds | 8.00 |
| Coumarin | 4.00 |
| Hydroxycitronellal | 2.00 |
| Lavender 40/42 | 11.00 |
| Patchouli | 4.00 |
| Spike lavender | 22.00 |
| Rosemary spanish | 17.00 |
| | 100.00 |

This perfume composition exhibits a highly desirable and useful herbal bouquet odor. As discussed hereinbefore, 1 - methyl-2-hydroxy-3-oxatricyclo[5.2.0.0$^{4,9}$]nonane (5) is useful in various perfume compositions. Thus, the components and proportions in the perfume composition of this example can be adjusted according to methods well known in the perfume art to form a wide variety of desirable perfume compositions containing odoriferously effective amounts of 5.

EXAMPLE IV

Detergent compositions

A conventional heavy-duty built detergent having the following composition is prepared.

| Component: | Percent by wt. |
|---|---|
| Sodium dodecyl benzene sulfonate | 20.0 |
| Sodium tripolyphosphate | 50.0 |
| Sodium silicate | 6.0 |
| Sodium sulfate | 14.0 |
| Water | 9.8 |
| Perfume composition of Example III | 0.2 |

This detergent composition exhibits a highly desirable herbal bouquet odor. Other perfume compositions containing odoriferously effective amounts of 1-methyl-2-hydroxy-3-oxatricyclo[5.2.0.0$^{4,9}$]nonane can be substituted on a weight basis for the perfume composition in the detergent composition of this example according to methods well known in the perfume art. Other detergent compositions, e.g., those disclosed in U.S. Pats. 3,159,581 and 3,213,030, can be substituted herein with satisfactory results.

EXAMPLE V

Detergent bar compositions

A conventional household detergent bar having the following composition is prepared.

| Component: | Percent by wt. |
|---|---|
| Sodium soap | 75.0 |
| Potassium soap [1] | 7.5 |
| Water | 15.0 |
| Perfume composition of Example III | 2.5 |

[1] The total soap comprises a mixture of 80% tallow soap and 20% coconut soap.

This detergent bar exhibits a highly desirable herbal bouquet odor. Other perfume compositions containing odoriferously effective amounts of 1-methyl-2-hydroxy-3-oxatricyclo[5.2.0.0$^{4,9}$]nonane can be substituted on a weight basis for the perfume composition in the detergent bar compositions of this example according to methods well known in the perfume art. Other detergent bars, e.g., those disclosed in U.S. Pat. 2,295,594, 3,066,354, and 2,407,649, can be substituted herein with satisfactory results.

As is apparent from the above discussion, each of the compounds 2, 3 and 4 has specific utility as an intermediate in the synthesis 5 and/or 6, which in turn exhibit highly desirable utilities based on their olfactory characteristics.

What is claimed is:

1. A compound selected from the group consisting of cis-2-nopinyl nitrite, 8-nitroso-cis-nopinol dimer, and 8-oximino-cis-nopinol.

References Cited

McAllister et al., J. Am. Chem. Soc., vol. 89, pp. 5982–3 (1967).

LELAND A. SEBASTIAN, Primary Examiner

U.S. Cl. X.R.

260—566 A, 647